US006971931B2

(12) United States Patent
    Davis (10) Patent No.: US 6,971,931 B2
(45) Date of Patent: Dec. 6, 2005

(54) AMPHIBIOUS VEHICLE

(75) Inventor: Graham Davis, Cornwall (GB)

(73) Assignee: Amphibious Projects International Limited, Dublin (IE)

( * ) Notice: Subject to any disclaimer, the term of this patent is extended or adjusted under 35 U.S.C. 154(b) by 0 days.

(21) Appl. No.: 10/692,998

(22) Filed: Oct. 24, 2003

(65) Prior Publication Data

US 2004/0142609 A1   Jul. 22, 2004

Related U.S. Application Data

(63) Continuation of application No. PCT/GB02/01908, filed on Apr. 29, 2002.

(30) Foreign Application Priority Data

Apr. 27, 2001   (GB) .................................... 0110347

(51) Int. Cl.[7] .............................. B63B 1/00; B60F 3/00
(52) U.S. Cl. .................................. 440/12.51; 114/61.17
(58) Field of Search ........................... 440/12.5, 12.51, 440/12.52, 12.54; 114/61.15, 61.16, 61.17

(56) References Cited

U.S. PATENT DOCUMENTS

| | | | | |
|---|---|---|---|---|
| 1,490,964 A | * | 4/1924 | Cook et al. | 440/12.52 |
| 3,027,862 A | * | 4/1962 | Votre | 440/12.54 |
| 3,661,114 A | * | 5/1972 | Wagner et al. | 440/12.52 |
| 4,048,685 A | * | 9/1977 | Gail | 114/344 |
| 5,315,950 A | * | 5/1994 | Abel | 440/12.5 |
| 5,687,669 A | * | 11/1997 | Engler | 440/12.52 |
| 6,116,972 A | * | 9/2000 | Bellezza Quater et al. | 440/12.51 |

* cited by examiner

Primary Examiner—Andrew D. Wright
(74) Attorney, Agent, or Firm—Hogan & Hartson L.L.P.

(57) ABSTRACT

An amphibious vehicle for land and water use comprises a main mono hull section and a pair of port and starboard sponsons which are movable from a stowed position under a main vehicle deck adjacent to the mono hull and a fully deployed position in which the sponsons are spaced apart from the mono hull by at least one hull width. The sponsons are each pivotally connected to the main hull by means of a pair of respective arms which together with the sponson and the hull define a parallel type four bar linkage. The sponsons stabilise the vehicle on water and are readily stowed to allow vehicle mobility on land.

9 Claims, 6 Drawing Sheets

AMPHIBIOUS VEHICLE

Related Applications

The present application is a continuation of PCT/GB02/01908 filed Apr. 29, 2002, entitled "Amphibious Vehicle", which designates the United States, and claims priority of British Patent Application No. GB 0110347.2 filed Apr. 27, 2001, both of which applications are incorporated by this reference in their entirety herein.

BACKGROUND OF THE INVENTION

This invention relates to amphibious vehicles and in particular concerns improvements relating to the stability of amphibious road vehicles on water.

The design of amphibious vehicles is often a compromise between the conflicting design requirements of road and water vehicles. For instance, amphibious road vehicles must satisfy certain design criteria for road use which conflict with water borne stability criteria. Water borne stability can be less than optimum when vehicle dimensions, in particular width, are determined for road use since narrow body amphibious vehicles optimised for manoeuvrability on roads generally have unstable narrow hulls.

There is a requirement for an amphibious road vehicle which is suitable for road and water use and which is both stable on water and manoeuvrable on land particularly on roads.

SUMMARY OF THE INVENTION

According to an aspect of the invention there is provided an amphibious vehicle having at least one sponson. In the context of the present invention the term sponson includes any flotation device positioned laterally on the hull of an amphibious vehicle. The additional buoyancy provided by the sponson improves the stability of the amphibious vehicle on water and allows narrow hull designs to be used for amphibious vehicles. A narrow hull can reduce hydrodynamic drag and hence fuel consumption as well as allowing higher vehicle speeds on water. Narrow hulls are also preferable for narrow body amphibious road vehicles.

Preferably, the sponson is movable between a stowed position and a deployed position. In this way the sponson may be moved to a deployed position for use of the vehicle on water and stowed when the vehicle is operating on land.

In preferred embodiments, the sponson is movable with respect to a main hull of the said vehicle.

The sponson may be spaced at least one hull width away from the said hull when in the said deployed position. This improves stability since the buoyancy forces acting on the sponson can provide a significant turning moment on the vehicle to stabilise the vehicle by reducing the vehicle's tendency to roll in both calm and rough water conditions.

The sponson may also be substantially flush with the said hull when in said stowed position. This allows the frontal cross-section area of the vehicle to be reduced when the sponson is not required, that is when the vehicle is to be driven on the road. Not only does this provide for vehicle manoeuvrability on the road but it also reduces aerodynamic drag on the vehicle when moving on the road.

Preferably, the sponson is positioned substantially parallel with the main hull when in the said stowed and deployed positions. This reduces hydrodynamic drag when in the deployed position and allows the sponson to be readily stowed next to the hull when not in use.

Preferably, the sponson is pivotally mounted with respect the said main hull. This readily permits the sponson to be deployed for use.

In preferred embodiments, the sponson comprises part of a respective parallelogram type four-bar linkage pivotally mounting the sponson with respect to the said main hull. The four bar linkage geometry provides for easy and accurate deployment of the sponson to its deployed position and further provides a mechanically stiff and robust structure which can readily transmit buoyancy turning moments generated by the sponson to the hull of the vehicle.

The sponson may be pivotally mounted with respect to the main hull about pivot axes inclined with respect to the plane of the keel of the said hull such that the sponson is raised with respect to the keel when moved from its stowed to deployed position. The sponson can be moved to a preferred operational position above the keel line of the main hull when deployed and stowed in a lower non-obstructive position when not in use.

In preferred embodiments, the sponson moves in an aft direction with respect to the vehicle when moved from its stowed to deployed position. This provides for a more compact design.

The amphibious vehicle preferably comprises a sponson on each side of the vehicle.

In this way buoyancy turning moments can be applied to the vehicle in both directions. This improves the above mentioned advantages since vehicle stability is significantly improved.

In preferred embodiments, the vehicle comprises fore and aft road wheels and the sponson is stowed in the region between the said fore and aft wheels. This provides a compact design and readily allows the sponson to be deployed without interfering with the road wheels.

In preferred embodiments, the amphibious vehicle comprises road wheels which are movable between a fully deployed position for road use and a stowed position for water borne operation, whereby the ride height of the vehicle on land can be adjusted by positioning the said wheels intermediate the said fully deployed and stowed positions. By retracting the road wheels to their stowed position hydrodynamic drag forces can be reduced.

The road wheels may be pivotally mounted with respect to the main hull of the vehicle for movement between their said respective stowed and deployed positions. This readily allows the road wheels to be moved between their respective stowed and deployed positions.

Preferably, the amphibious vehicle is a passenger vehicle.

In another aspect of the invention there is provided an amphibious vehicle having a transom extension member which is movable to a deployed position for increasing the effective water line length of the vehicle by at least 5%. This is capable of significantly reducing the hydrodynamic drag forces acting on the vehicle and particularly at speeds above 12 knots. This provides a more efficient hull design allowing higher speeds to be reached as well as reducing fuel consumption.

In another aspect of the invention a amphibious vehicle comprises a hull having at least one propeller tunnel having a depth dimension greater than half the propeller diameter of the propeller in the said tunnel.

BRIEF DESCRIPTION OF THE DRAWINGS

Various embodiments which more particularly describe the invention will now be described, by way of example only, with reference to the accompanying drawings, in which.

DETAILED DESCRIPTION

Figure 1:
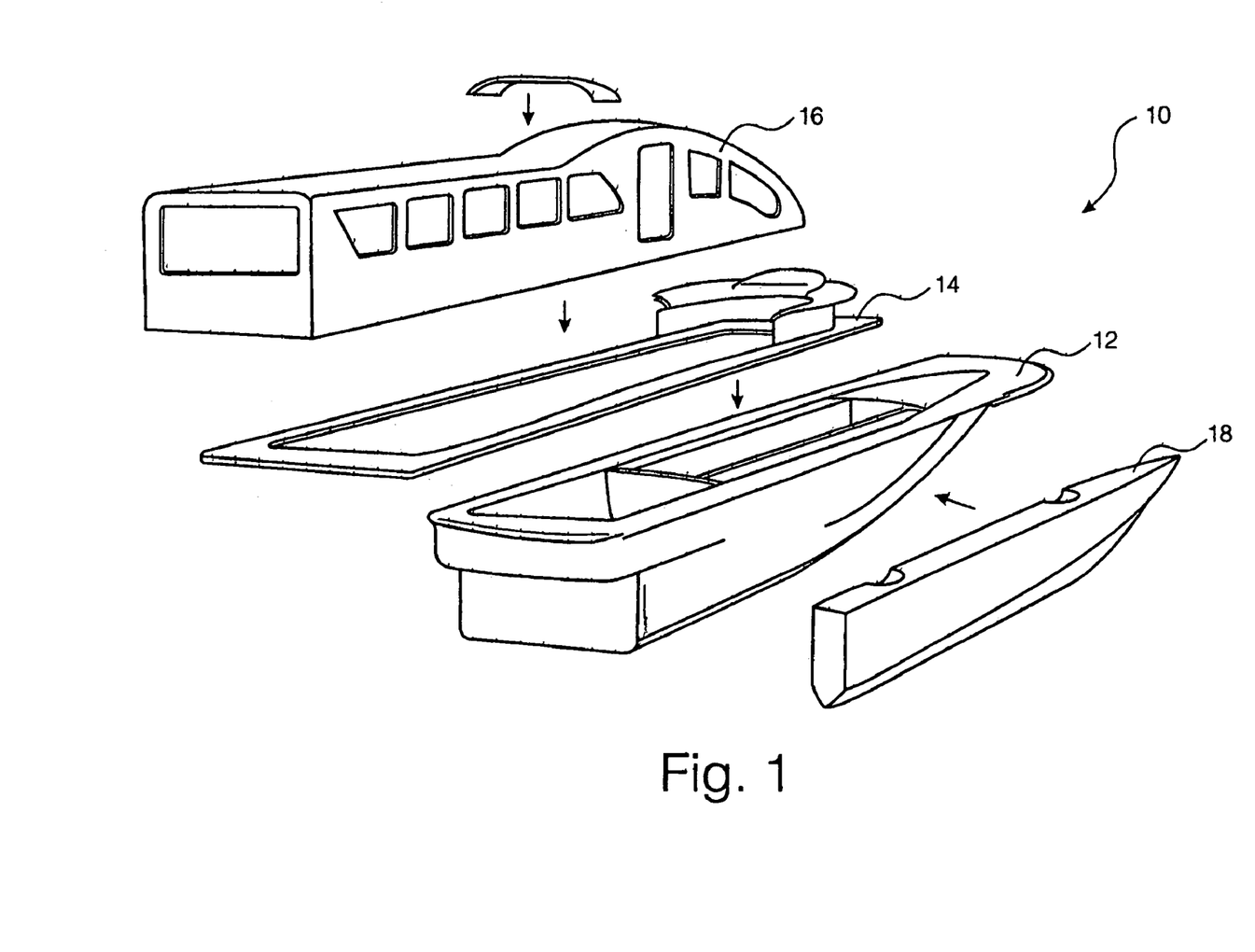
FIG. 1 is an exploded view of the main components of an amphibious road vehicle.

Referring to FIG. 1 the main structural components of an amphibious road vehicle are shown in exploded view. The main structural components include a mono-hull 12, a passenger deck 14 and a passenger cabin 16. The vehicle 10 also comprises a pair of sponsons 18, only the starboard sponson being shown in FIG. 1. The mono-hull, deck, passenger cabin and sponsons are constructed using an epoxy glass reinforced material and high density foam in a sandwich laminate construction. The sponsons 18 are additionally filled with a solid buoyancy material.

Figure 2:
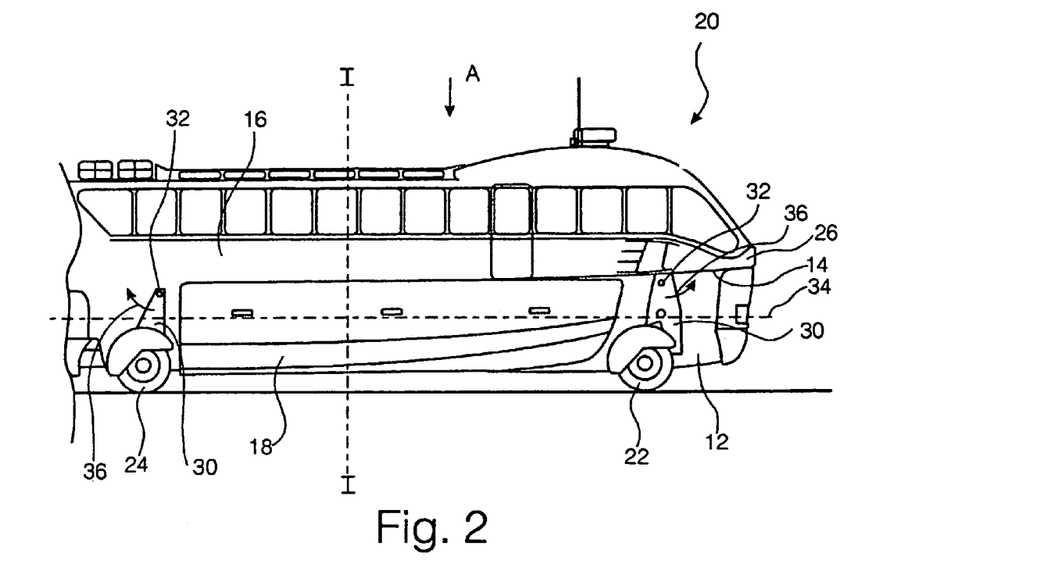
FIG. 2 is a side elevation of an amphibious vehicle comprising the components shown in FIG. 1.

The main structural components are assembled to form an amphibious road vehicle of the type indicated at 20 in FIG. 2. The amphibious vehicle of FIG. 2 has a length of approximately 12 meters a beam or width for approximately 2.5 meters, a height of approximately 4 meters and is adapted to carry 40 passengers and 2 crew members. The vehicle 20 has fore and aft road wheels 22 and 24 positioned towards the vehicle's bow 26 and stem 28 respectively. The wheels 22 and 24 are rotatably mounted on respective pivot supports 30 which are pivotally mounted about respective pivot axis 32 for movement of the wheels between the deployed position shown in FIG. 2 and a stowed position (not shown) above the nominal water line indicated by the chain dot line 34. The fore and aft pivots 30 are movable about their respective pivot axes 32 in the direction indicated by the respective directional arrows 36. A sponson 18 is mounted on each side of the vehicle 20 between the fore and aft wheels 22 and 24 below the deck 14 (towards the bottom of the drawing in FIG. 2).

Figure 3:
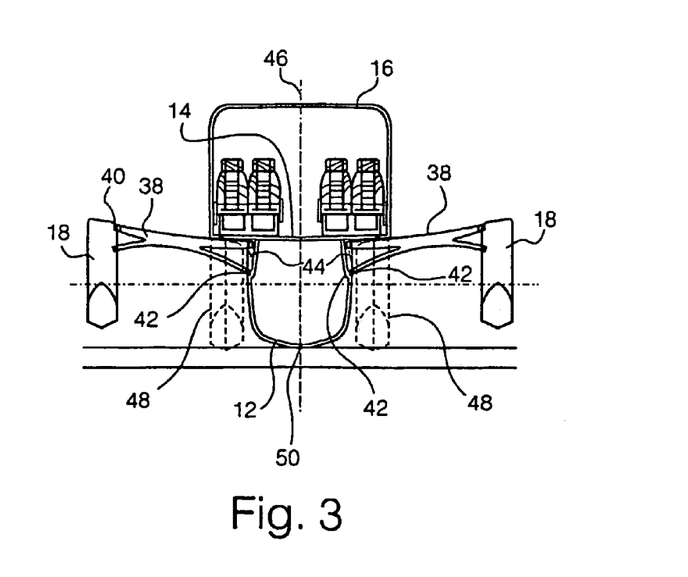
FIG. 3 is a cross-sectional view along line I—I of FIG. 2.

Referring to FIG. 3, the port and starboard sponsons are each pivotally connected to a respective side of the hull 12 by means of arms 38. The arms 38 are generally X-shaped having two pivotal connection points 40 at one end connecting the arm to the sponson and two further pivotal connection points 42 at the other end connecting the arm to the hull about an axis 44 inclined with respect to the plane of the hull indicated by the chain dot line 46. The sponsons 18 are each movable between their respective stowed positions, as indicated by the dashed sponson outlines 48 where they lie parallel with and adjacent to the hull 12, and their respective deployed positions as shown by the solid lines in the drawing. When deployed to the position shown in FIG. 3 the sponsons are spaced at least one hull width away from the sides of the hull so that the overall width or beam of the vehicle is extended to approximately 6 meters from starboard to port sponson.

As shown in FIG. 3 the inclined nature of the pivot axes 44 causes the sponsons 18 to move in a direction away from the keel 50 of the hull when deployed so that the sponsons contribute little to the buoyancy of the vehicle other than to stabilise the vehicle on the water. The primary buoyancy of the vehicle is provided by the mono-hull 12. This reduces the loads supported by the arms 38 during normal operation. The action of raising the sponsons to the deployed position shown above the keel line has the desired affect that the sponsons act mainly as stabilisers and not secondary hulls.

Figure 4:
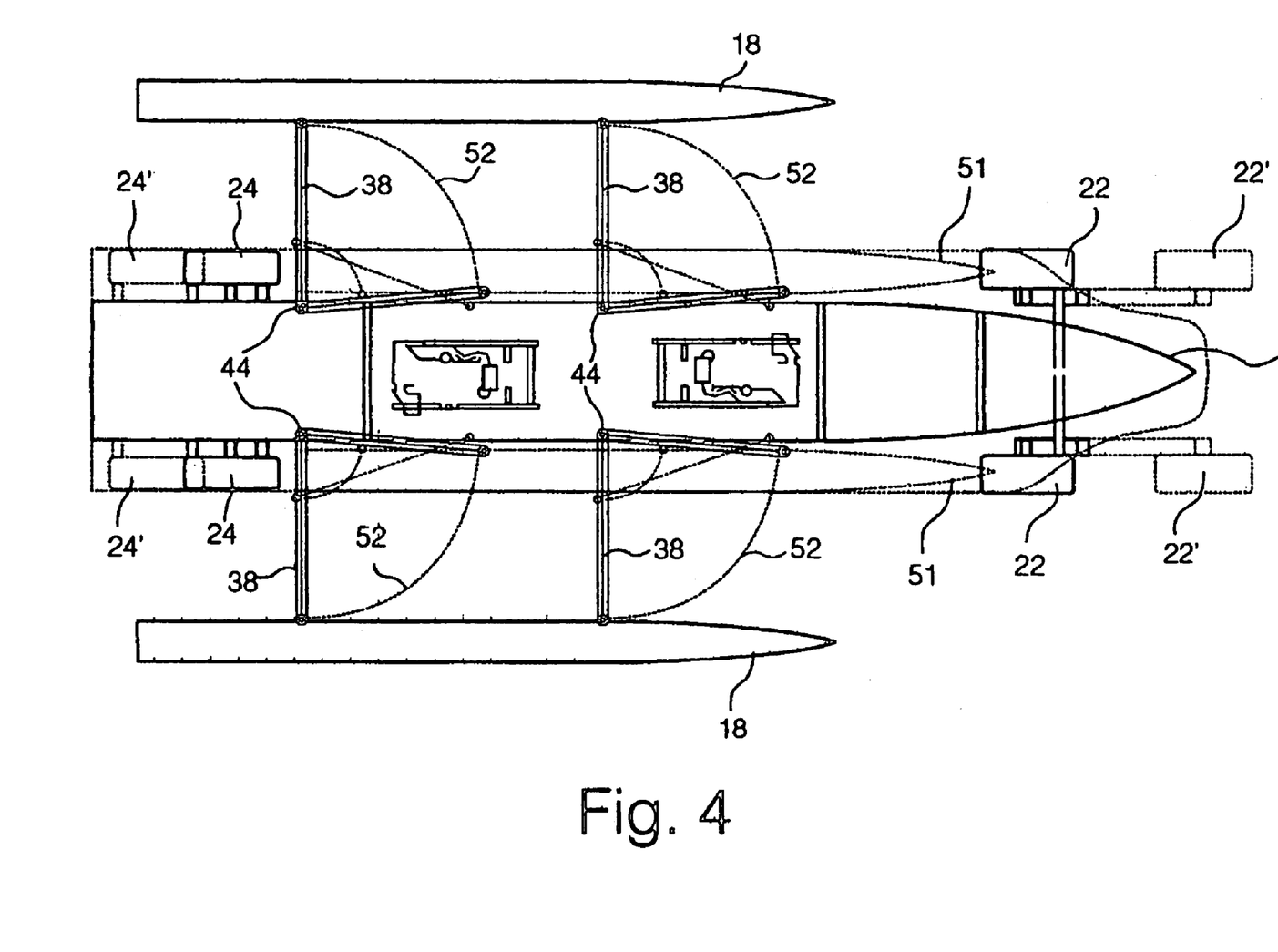
FIG. 4 is a plan view in the direction of arrow A in FIG. 2.

Referring now to FIG. 4, the sponsons 18 are each pivotally connected to a respective side of the hull 12 by two arms 38 spaced along the length of the hull. On each side of the vehicle the sponson 18 forms part of a parallelogram type four bar linkage with the arms 38 and the hull 12 so that the sponson can be readily moved between the deployed position, shown where it lies parallel with and spaced apart from the hull 12, and the stowed position indicated by the respective dashed outlines 51 by movement of the arms 38 about their respective pivot axes 44 through an arc of approximately 90° as indicated by respective chain lines 52. The four bar linkage arrangement causes the sponsons 18 to move aft when they are moved from their stowed position to their deployed position. Throughout the movement sequence the sponsons remain parallel with the hull 12 until they are locked in the deployed position by locking means (not shown).

The drawing of FIG. 4 also shows the position of the fore and aft road wheels when moved to their raised position above the water line 34. The raised or stowed position of the four road wheels 22 is indicated by the chain dot lines 22' and the stowed or raised position of the aft road wheels 24 is indicated by the chain dot lines 24'.

Figure 5:
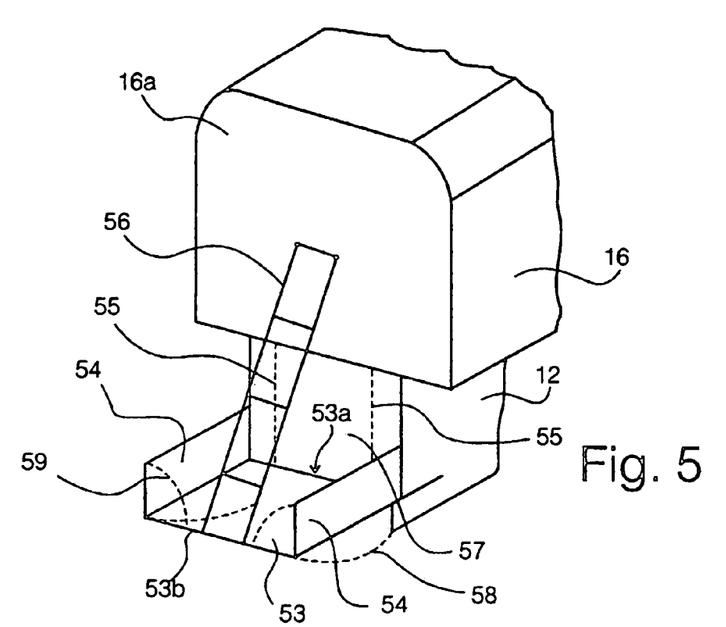
FIG. 5 is a perspective view of the aft end of the vehicle of FIGS. 1 to 4 with a horizontally deployed transom.
Figure 6:
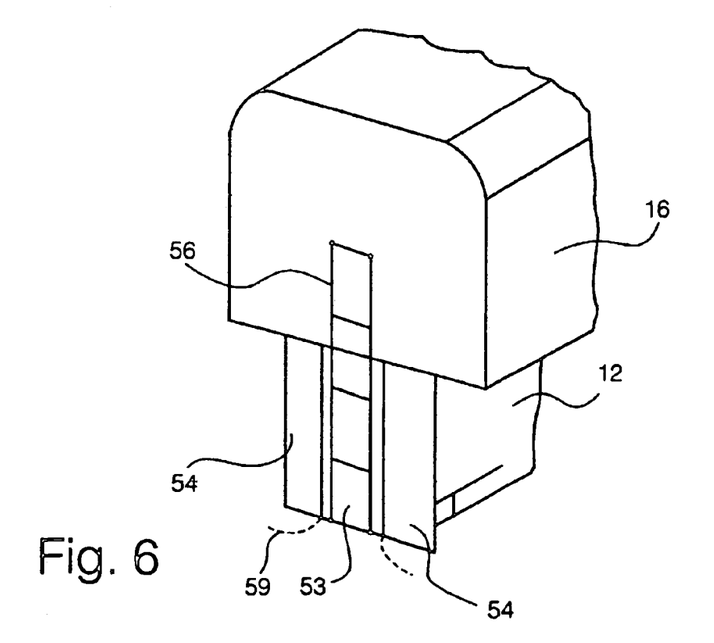
FIG. 6 is a perspective view of the aft end as FIG. 5 with the transom in a vertical stowed position.

Referring now to FIG. 5, in preferred embodiments the amphibious vehicle comprises a transom extension which is moveable between a deployed and stowed position as shown in FIGS. 5 and 6 respectively. The transom extension comprises a generally flat rectangular panel 53 which is pivotally mounted at its forward edge 53a to a pair of vertical slide supports 55 mounted on the vertical end panel or transom 57 of the hull. The aft end 53b of the panel 53 is pivotally connected to a pivotal support 56 in the form of a ladder type member which is pivoted at its other end to a vertical panel 16a comprising the aft end of passenger compartment 16. A pair of lateral side panels 54 are pivotally mounted along the lateral side edges of the panel 53 between the edges 53a and 53b. The side panels 54 are moveable between their deployed positions shown in FIG. 5 and a stowed position where they lie flat against the panel 53. In the deployed position of FIG. 5 the transom extension panel 53 extends substantially horizontally and perpendicular to the hull end transom panel 57a.

In the stowed position of FIG. 6 the panels 53 lie substantially flat against the transom panel 57 facing outwards and with the pivotal support 56 lying flat against the panel 53 and the end panel 16a.

In the embodiment of FIGS. 5 and 6 the transom extension panel 53 has a width of approximately 1.5 meters, a length of approximately 1.5 meters and the side panels 54 have a width of approximately 0.5 meters. The transom extension extends the effective water line length of the amphibious vehicle by at least 5% reducing the hydrodynamic drag on the vehicle particularly at speeds above 12 knots. In this respect the effective water line length of the vehicle can be increased by deploying the transom extension while manoeuvrability of the vehicle on land is not affected when the transom is in the stowed position as shown in FIG. 6. The transom extension is moved to the stowed position by sliding the forward edge 53a along the slide supports 55 while the aft edge 53b is pivoted towards the vertical transom panel 57 along the trajectory indicated by the chain dot lines 58. The side panels 54 fold flat against the main panel 53 as indicated by the chain dot lines 59.

Figure 7:
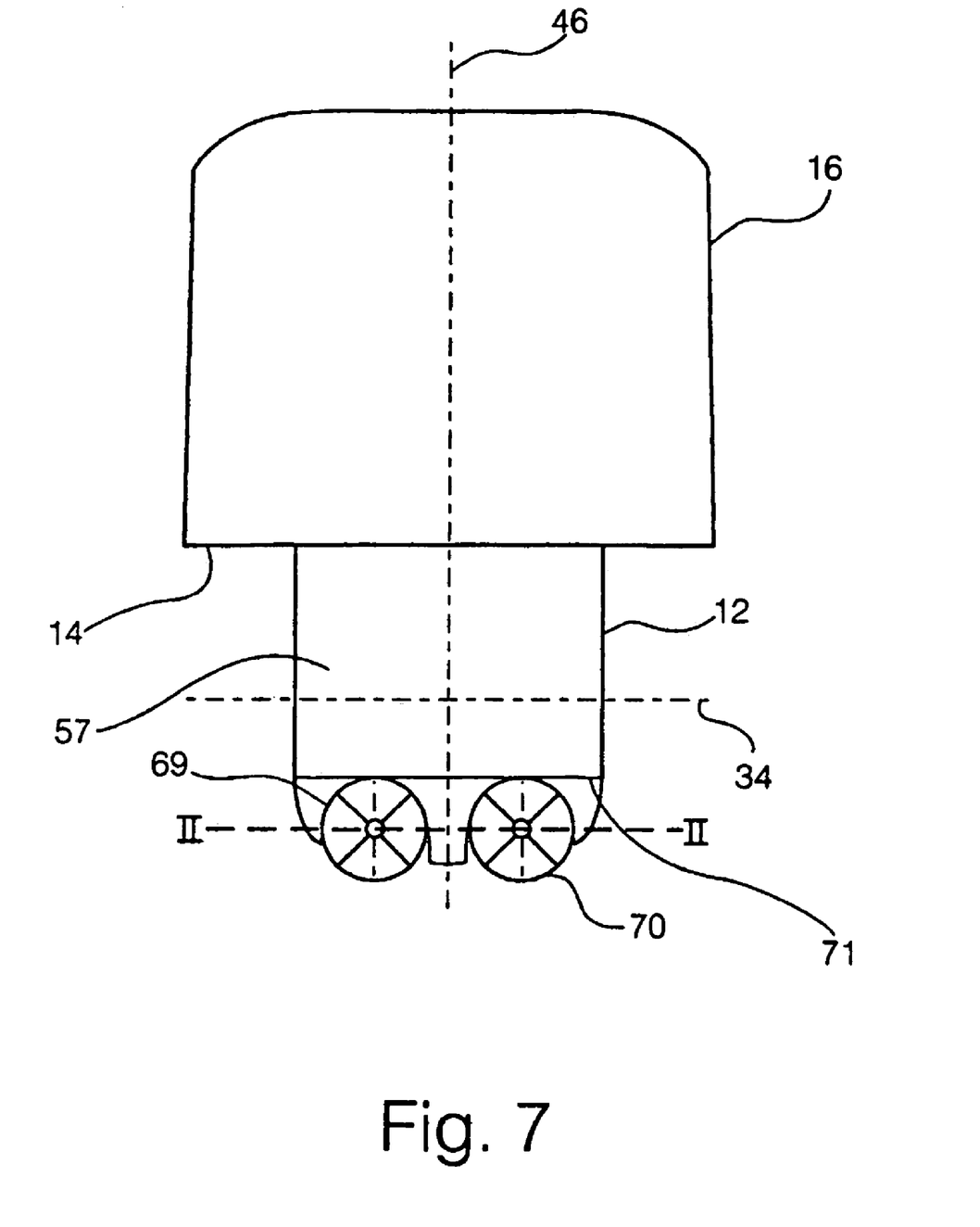
FIG. 7 is an end view of the aft end of the vehicle of FIGS. 1 to 6.

In the deployed position of FIG. 5 the panel 53 lies substantially tangential to a pair of parallel and substantially semi-circular cross-section propeller duct tunnels 69 extending at least part way along the rear section of the hull 12. This can be best seen with reference to FIG. 7 where the underside of the panel 53 is indicated at 71.

Figure 8:
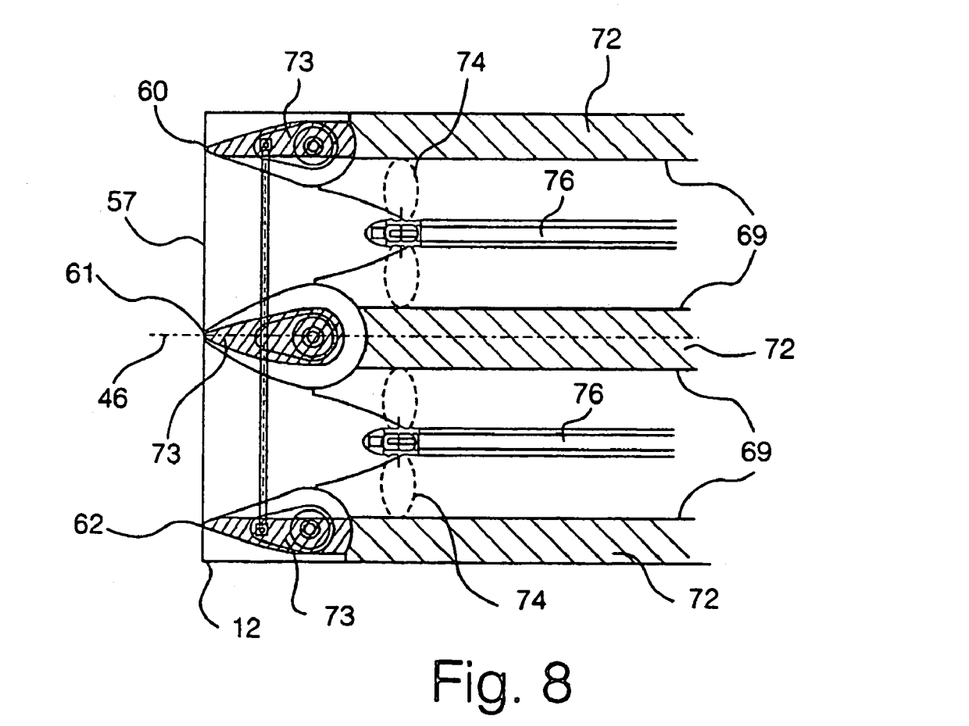
FIG. 8 is a cross-section view along line II—II of FIG. 7.

Referring to FIG. 8, three flow direction flaps 60, 61 and 62 are pivotally mounted at their respective upstream ends to the aft end of the propeller tunnel wall sections 72. The port side flap 60 is mounted at the end of the port side tunnel wall, the starboard side flap 52 is mounted at the end of the starboard side tunnel wall and the central flap 61 is mounted at the end of the central tunnel dividing wall between the port and starboard tunnels. The flaps 60, 61 and 62 have aerofoil type cross-sections and are arranged with their trailing edges at the downstream end of the propeller tunnels. The propellers are mounted on respective drive shafts 76 upstream of the flaps 60, 61 and 62 so that the flow of water exiting the propellers can be directed by moving the flaps about their respective pivot axes.

Figure 9:
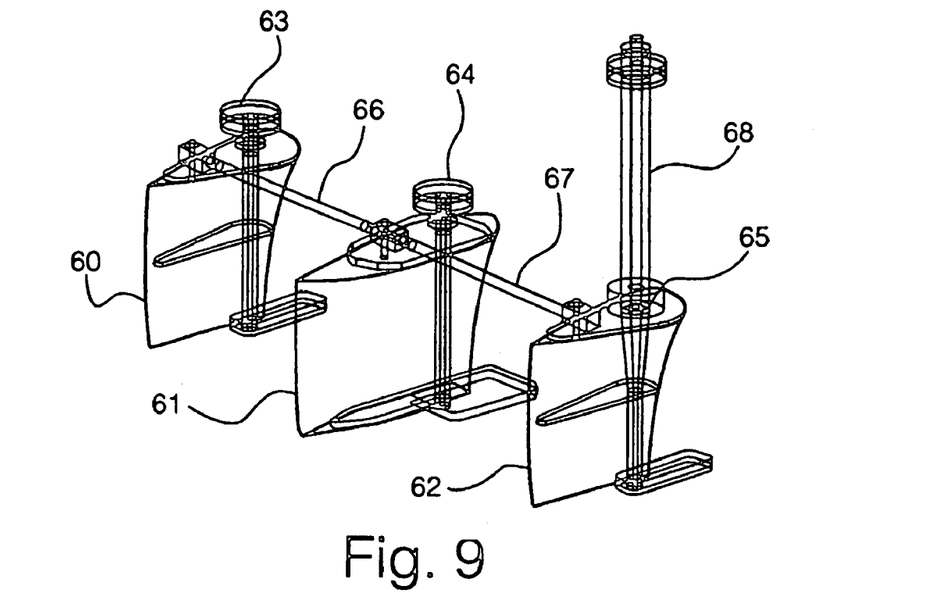
FIG. 9 is a detailed perspective view of the flow direction flap assembly shown in FIG. 8.

As can best be seen with reference to FIG. 9, the flaps 60, 61 and 62 are mounted at their upstream ends on respective spindles 63, 64 and 65 extending perpendicular to the aerofoil cross-sections of the flaps. The spindles 63, 64 and 65 are aligned with each other and the flaps 60,61 and 62 are pivotally connected together by means of a pair of bar type links 66 and 67. The links 66 and 67 are connected towards the downstream end of the flaps so that rotation of the starboard flap 62 about its axis 65 by rotation of a co-axially mounted actuator shaft 68 causes translation of the links 66 and 67 which imparts a turning moment on the flaps 60 and 61 so that all three flaps turn in unison about their respective pivot axes by equal angular amounts. The shaft 68 preferably extends through an aperture in the hull and is connected to an actuator linked to or controlled by the vehicle steering system (not shown).

It is preferred that the amphibious vehicle described comprises so-called "deep propeller tunnels" in combination with the flow direction flaps 60, 61 and 62. In the context of this description a "deep propeller tunnel" has a depth dimension greater than half the diameter of the propeller that is mounted within the tunnel duct. Deep tunnels allow the propellers to be protected and provide a greater hull displacement for restricted hull length, breadth and depth dimensions. As shown in FIG. 8 the flow direction flaps are fitted aft of the propellers for directing the thrust from the propeller to port or starboard to manoeuvre the vehicle in the water. The flow direction flaps in the embodiment described are arranged so that on deflecting the flow from the propellers the minimum amount of flow restriction is induced thereby maintaining speed during manoeuvring, reducing the turning circle and allowing the vehicle to be turned within its own length when on water.

What is claimed is:
1. An amphibious vehicle comprising:
   (i) a main hull for providing the primary buoyancy of the vehicle;
   (ii) a sponson positioned on and mounted to each side of the main hull; and
   (iii) fore and aft road wheels,
the sponsons being movable relative to the main hull and relative to said fore and aft wheels between (a) a stowed position where each sponson is adjacent to and located to one side of said main hull, and (b) a deployed position wherein each sponson is spaced from respective sides of said main hull and additional buoyancy providable by said sponsons provides additional stability to the main hull,
wherein said sponsons are each spaced at least one hull width away from the said hull when in said deployed position.

2. An amphibious vehicle comprising:
   (i) a main hull for providing the primary buoyancy of the vehicle;
   (ii) a sponson positioned on and mounted to each side of the main hull; and
   (iii) fore and aft road wheels,
the sponsons being movable relative to the main hull and relative to said fore and aft wheels between (a) a stowed position where each sponson is adjacent to and located to one side of said main hull, and (b) a deployed position wherein each sponson is spaced from respective sides of said main hull and additional buoyancy providable by said sponsons provides additional stability to the main hull,
wherein said sponsons are substantially flush with the said hull when in said stowed position.

3. An amphibious vehicle comprising:
   (i) a main hull for providing the primary buoyancy of the vehicle;
   (ii) a sponson positioned on and mounted to each side of the main hull; and
   (iii) fore and aft road wheels,
the sponsons being movable relative to the main hull and relative to said fore and aft wheels between (a) a stowed position where each sponson is adjacent to and located to one side of said main hull, and (b) a deployed position wherein each sponson is spaced from respective sides of said main hull and additional buoyancy providable by said sponsons provides additional stability to the main hull,
wherein each of said sponsons is mounted with respect to the said main hull by a linkage of pivoted arms, and wherein each sponson comprises part of respective parallelogram linkages pivotally mounting said sponsons to said main hull.

4. An amphibious vehicle comprising:
   (i) a main hull for providing the primary buoyancy of the vehicle;
   (ii) a sponson positioned on and mounted to each side of the main hull; and
   (iii) fore and aft road wheels,
the sponsons being movable relative to the main hull and relative to said fore and aft wheels between (a) a stowed position where each sponson is adjacent to and located to one side of said main hull, and (b) a deployed position wherein each sponson is spaced from respective sides of said main hull and additional buoyancy providable by said sponsons provides additional stability to the main hull,
wherein each of said sponsons is mounted with respect to the said main hull by a linkage of pivoted arms, and wherein each sponson is pivotally mounted with respect to the main hull about pivot axes inclined with respect to hull when moved from its stowed to deployed position.

5. An amphibious vehicle as claimed in claim 4 wherein each sponson moves in an aft direction with respect to the vehicle when moved from its stowed to deployed position.

6. An amphibious vehicle comprising:
   (i) a main hull for providing the primary buoyancy of the vehicle;
   (ii) a sponson positioned on and mounted to each side of the main hull; and
   (iii) fore and aft road wheels,
the sponsons being movable relative to the main hull and relative to said fore and aft wheels between (a) a stowed position where each sponson is adjacent to and located to one side of said main hull, and (b) a deployed position wherein each sponson is spaced from respective sides of said main hull and additional buoyancy providable by said sponsons provides additional stability to the main hull,
wherein the vehicle comprises a transom extension member for increasing the effective water line length of the vehicle by at least 5%.

7. An amphibious vehicle as claimed in claim 6 wherein the transom extension member is movable between a deployed position substantially parallel with the water line of the said vehicle and a stowed position.

8. An amphibious vehicle as claimed in claim 7 wherein the vehicle has fore and aft ends and the transom extension member stows substantially flat against the aft end of the vehicle.

9. An amphibious vehicle comprising:
   (i) a main hull for providing the primary buoyancy of the vehicle; and
   (ii) a sponson positioned on and mounted to each side of the main hull,
the sponsons being movable relative to the main hull between (a) a stowed position where each sponson is adjacent to said main hull and said main hull is between the sponsons; and (b) a deployed position wherein each sponson is spaced from said sides of said main hull and additional buoyancy providable by said sponsons provides additional stability to the main hull,
wherein the amphibious vehicle further comprises a load carrying deck on the hull and wherein the sponson are located beneath the deck in the stowed position, and wherein the sponsons are deployed to a position out from beneath the deck in the deployed position.

* * * * *